May 5, 1953

W. A. RAY 2,637,618

COMBINATION RECORDING AND MAGNETICALLY
OPERATED INDICATING INSTRUMENT

Filed July 22, 1949

INVENTOR.
William A. Ray
BY John Flam
ATTORNEY

May 5, 1953

W. A. RAY 2,637,618

COMBINATION RECORDING AND MAGNETICALLY
OPERATED INDICATING INSTRUMENT

Filed July 22, 1949

INVENTOR.
William A. Ray
BY John Flam
ATTORNEY

Patented May 5, 1953

2,637,618

UNITED STATES PATENT OFFICE 2,637,618

COMBINATION RECORDING AND MAGNETICALLY OPERATED INDICATING INSTRUMENT

William A. Ray, North Hollywood, Calif., assignor to General Controls Co., a corporation of California Application July 22, 1949, Serial No. 106,226

6 Claims. (Cl. 346—17)

This invention relates to a combination indicating and recording instrument incorporating, for instance, a stylus movable in response to the condition desired to be measured, and a periodically removable chart with which the stylus cooperates to imprint a continuous graphic record.

In devices of this character, auxiliary indicating means are used in order that the reading may be observed at any instant more readily than by an examination of the chart.

Heretofore, in devices of this character wherein indicating and recording instruments are combined, great inconvenience has been encountered when the completed graphic record is desired to be removed and a new blank chart inserted, as the indicating arm is ordinarily in the way. Changing charts usually entailed a complete removal of the indicating arm, with an attending risk of damaging it. Furthermore, this manipulation is inconvenient, consuming considerable time.

It is accordingly one object of this invention to provide a combination indicating and recording instrument which obviates these hazards and inconveniences. For this purpose, use is made of an indicator comprising a freely rotatable permanent magnet, a movable cover or door in which the indicator pointer is mounted, and a cooperating permanent magnet movable in response to the condition desired to be measured, the last-named permanent magnet being driven from a source common to that of the recording mechanism. The cover has a transparent portion permitting viewing of the pointer indicator when the cover is in closed position.

It is another object of this invention to provide a combination indicating and recording instrument that is compact, as well as economical, with respect to construction. For this purpose, the door or cover in which the indicator is supported is adapted to cover or uncover the recording instrument for gaining access thereto, this door also forming a cover for the recording instrument to protect it from the surrounding atmosphere.

It is still another object of this invention to provide a combination indicating and recording instrument having common driving means and yet permitting the indicator to be displaced with respect to the recorder without a substantial disassembly of the mechanism.

It is still another object of this invention to provide a combination indicating and recording instrument in which an indicator is mounted on a cover for the apparatus, the indicator being visible within the cover, and the recorder mechanism being also visible through the cover, the cover providing a transparent frame for the indicator.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
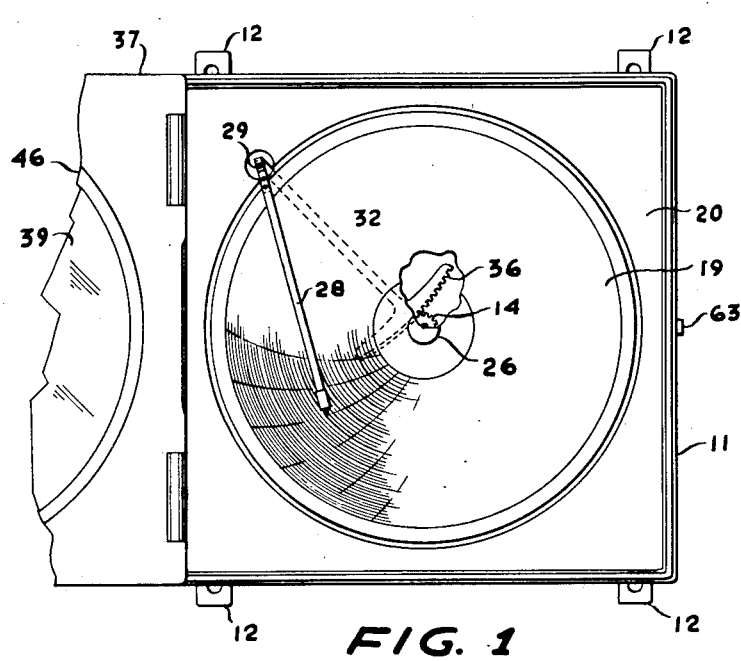
Figure 1 is an elevation showing a part of the device incorporating this invention, with the cover member open, and showing in particular the recorder mechanism.

The indicating and recording instrument is adapted to be operated by a condition responsive mechanism 10. This condition responsive mechanism 10 may be, for instance, a bellows, a servo mechanism, a thermo-responsive unit, or the like. This mechanism may be responsive to temperature, pressure, or similar properties, and is mounted within a housing 11. The housing 11 may be appropriately secured at a convenient location, as by the aid of screws or bolts (not shown), cooperating with suitably apertured lugs or feet 12 provided on the housing 11.

The condition-responsive mechanism 10 is adapted angularly to position a shaft 13 according to the variation of the condition desired to be measured. Appropriately secured to this shaft are a pinion gear 14 and a magnetic member in the form of a permanent U-shaped magnet 15 having defined pole faces. The pinion gear 14 operates a recording stylus 16, and the magnet 15 operates the indicator arm 17, as will be hereinafter described.

A constant speed device, such as a timing motor drive 18 for moving a removable chart 19, is mounted on a stationary internal plate or cover member 20 appropriately secured to the housing 11. This member 20 is non-magnetic, and may be formed from sheet metal. The housing 11 has a flange portion 21 providing a peripheral surface or shoulder 22 to which cover member 20 may be secured. The timing motor drive 18 rotates the shaft 23 at a constant rate through appropriate speed reduction mechanism.

For coupling the chart 19 to the timing motor drive 18, the shaft 23 is hollowed at one end, and also radially enlarged to form a cup portion 24 providing an annular lip portion 25 substantially coplanar with the outer surface of the internal cover member 20.

A plug 26, made from rubber, or the like, is adapted to fit frictionally into the cup portion 24, and has an annular flange 27 adapted to cooperate with lip 25 and to secure the chart 19 therebetween so that it may be rotatable with the shaft 23. As the lip portion 25 is substantially coplanar with outer surface of the plate or cover member 20, and as the chart 19 is adapted to contact this lip portion 25 as heretofore described, the member 20 will form a backing for the positioned chart 19.

A stylus arm 28 carrying the stylus 16 is adapted to be moved substantially radially with respect to the chart 19, according to the variation in the angular position of the shaft 13, which shaft 13 is positioned by the condition-responsive mechanism 10. This arm 28 is preferably made of material capable of flexure, so that the stylus 16 may be lifted from the chart 19 without actually disassembling the parts.

The flexible stylus arm 28 is secured to the short end 29 of a substantially hook-shaped member 30, as by the aid of rivets 31. The hook-shaped member 30 is provided with apertures in both end portions 29, 32, adjacent the bottom 33 of the member 30. A stationary pin 34, mounted on a support 35 provided within the housing 11, cooperates with the apertures of the hook-shaped member 30 and defines an axis of rotation for the hook-shaped member 30.

The other end 32 of the hook-shaped member 30 carries a gear segment 36 adapted to cooperate with the pinion gear 14. This segment may be formed integrally with member 30. Thus, for a particular angular position of the shaft 13, the stylus arm 28 assumes a definite corresponding radial position with respect to the chart 19. Through the gearing mechanism comprising the pinion gear 14 and the gear segment 36 the angular movement of the resilient stylus arm 28 is confined to the chart 19 even though the shaft 13 may undergo large angular movements.

The magnet 15, being directly coupled with the shaft 13, is angularly positioned together therewith, according to the variation of the condition measured by the condition-responsive mechanism 10.

A cover member 37 for the housing 11, suitably hinged thereto, is adapted to carry and house the indicator 17 therein. This indicator 17 is freely rotatable within a housing formed by a pair of glass plates 38 and 39 forming a part of the cover 37 in a manner hereinafter described. A pointer 40 is formed at one end of the indicator 17.

Figure 2:
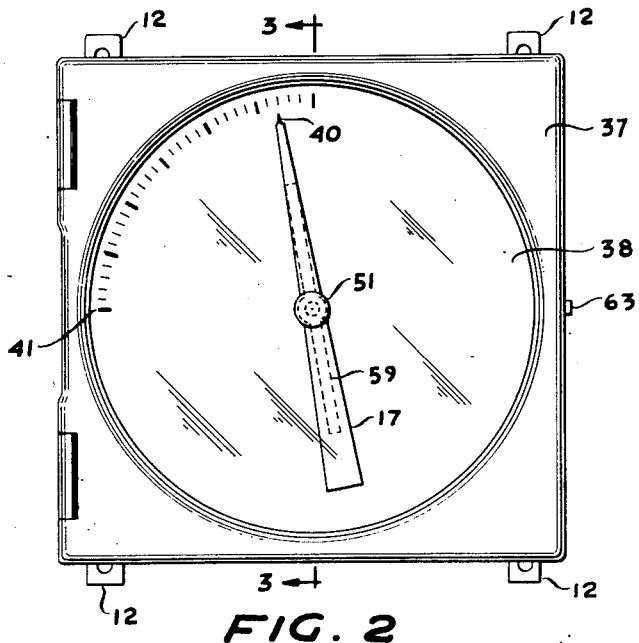
Fig. 2 is an elevation similar to Fig. 1, showing the indicator mechanism, the cover member being closed.
Figure 3:
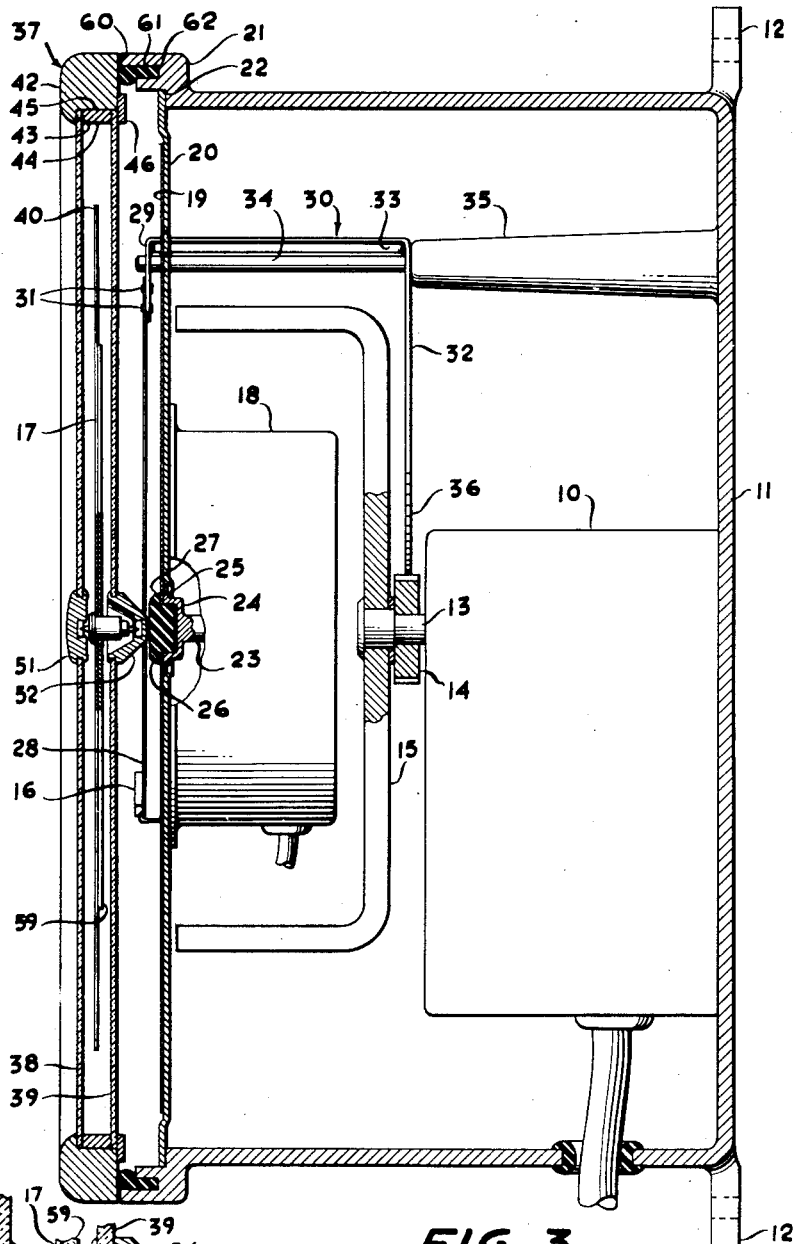
Fig. 3 is an enlarged view, partly in section, taken along the plane 3—3 of Fig. 2.

For purposes of convenience, a scale 41 may be appropriately provided on one of the glass plates 38, as shown in Fig. 2, with which the freely rotatable indicator 17 may cooperate.

For integrating these glass plates 38 and 39, the frame portion 42 of the cover member 37 provides a peripheral shoulder 43 extending radially inwardly of the frame 42. The glass plates 38 and 39, spaced by a spacer collar 44, are adapted to be inserted within the neck portion 45 of the frame 42 defined by the shoulder 43. A retainer ring 46, secured to the frame 42, confines the glass plates 38 and 39 to the frame 42.

Figure 4:
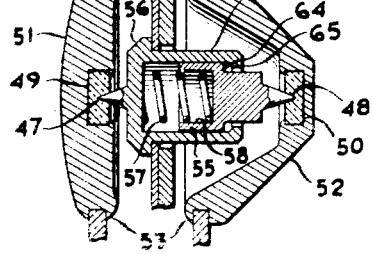
Fig. 4 is a sectional view showing, on a larger scale, the pivot mounting of the indicator within the cover member.

As shown most clearly in Fig. 4, the indicator 17 is mounted for free rotation between the glass plates 38 and 39, by the aid of a pair of pivot points 47 and 48, cooperating with jewel bearings 49 and 50 appropriately disposed respectively in jewel bearing supports 51 and 52. These supports 51 and 52 are secured to the central portion of the glass plates 38 and 39, respectively, as by having upset edges 53 adapted to overlie the surfaces of the glass plates 38 and 39.

For providing a mounting for the indicator 17 with respect to the pivot points 47 and 48, a pair of telescoping members 54 and 55 are provided. Each of these telescoping members 54 and 55 carries one of the pivot points 47 or 48. To the outer telescoping member 54 is secured the indicator 17, as by the aid of a radially outwardly extending shoulder 56 cooperating with the indicator 17.

For resiliently urging the members apart in order that the pivot points 47 and 48 engage the jewel bearings 49 and 50, a compression spring 57 is provided between the telescoping members 54 and 55. This spring 57 abuts at one end the outer telescoping member 54 and, at the other end, is contained in a cup portion 58 of the inner telescoping member 55. In order that the indicator 17 and the telescoping members 54 and 55 may be assembled as a unit between the glass plates 38 and 39, there may be provided on each of the telescoping members cooperating shoulders 64 and 65 limiting the relative movement of the telescoping members 54 and 55.

Should there be any excessive jarring of the cover member 37 as, for instance, when the cover member 37 is being closed, the spring 57 will absorb a large portion of the shock otherwise directly transferred to the delicate indicator 17. By providing an indicator support incorporating telescoping members 54 and 55, together with spring 57 therein, a non-rigid connection is formed between the cover member 37 and the indicator 17.

To the indicator 17 is secured a magnetic member in the form of a permanent magnet 59 having defined pole faces. The pole faces of this magnet 59 are adapted to cooperate with the respective pole faces of the magnet 15 when the cover member 37 is closed. In this closed relation, the indicator 17 is free to move about an axis substantially coaxial with the axis of the shaft 13 about which the magnet 15 is angularly positioned. Thus, for any particular angular position of the magnet 15, the cooperating magnet 59 will be caused to assume a corresponding angular position, carrying the indicator 17 along. Furthermore, a movement of the magnet 15, in response to a change in the condition to be measured, will cause the magnet 59 to follow, and the freely rotatable indicator 17 is correspondingly moved.

There is no danger that the indicator 17 will assume an incorrect position, such as when the magnets 15 and 59 are moved into cooperative relationship by the cover member 37 being closed, as there is only one position of equilibrium between the magnets 15 and 59, both being permanent magnets having well defined directions of magnetization.

The inner surface 60 of the frame 42 of the cover member 37 is adapted to engage a sealing gasket 61 appropriately provided within a recess 62 in the flange 21 of the housing 11, so that the housing 11 may be thereby substantially sealed. A latch 63 is adapted to lock the cover member 37 in closed position. Thus, in the normal operation of the indicating and recording mechanism, as shown in Fig. 2, the cover member 37 being closed, the delicate parts of the recording system are protected within the housing 11.

In the closed position of the cover, the permanent magnet 59 is sufficiently near the magnet 15 so that the magnetic forces mutually produced may coact. Thus, the indicator 17 assumes an angular position corresponding to that of the magnet 15, giving an instantaneous indication of the condition desired to be measured, as by scale 41, magnet 15 having been angularly positioned by the condition-responsive mechanism 10.

If it is desired to replace the removable chart 19, the cover member 37 is opened, and the indicator 17 thereby easily moved aside, thus permitting a ready removal and replacement of the removable chart 19, as by lifting the resilient stylus arm 28 and removing the plug 26. After a new chart is inserted, the cover member 37 may be closed; the magnet 59, being substantially freely rotatable on the bearings 49 and 50, will be caused to assume the position defined by the particular position of the magnet 15, and the indication of the condition is again easily established. In closed position both the indicator 17 and the recorder mechanism are visible through the transparent portion of the cover member 37.

The inventor claims:

1. In an indicating and recording mechanism adapted to cooperate with a condition responsive mechanism: a recording mechanism including means for moving a chart support, and recording means cooperating with said support and movable by said condition responsive mechanism; a first permanent magnet positioned by said condition responsive mechanism; an indicator; a second permanent magnet secured to said indicator movable by magnetic cooperation with said first permanent magnet; a housing for said indicator and said second magnet, including a pair of transparent members between which said indicator is supported, said housing being movably mounted with respect to said recording mechanism; a pair of telescoping members adapted to support said indicator within said housing, there being a pair of pivot points carried by each of said telescoping members; bearing structures mounted centrally respectively of said transparent members and adapted to cooperate with said pivot points permitting free rotation of said indicator; and spring means interposed between said telescoping members urging said pivot points to contact said bearing structures.

2. In a measuring instrument adapted to cooperate with a condition responsive mechanism: a housing for said condition responsive mechanism; a cover member for said housing comprising a frame portion movable with respect to said housing, a pair of spaced transparent members immovably mounted on said frame; an indicator; a pair of means mounted centrally of said transparent members respectively for supporting said indicator between said transparent plates; and means external of said cover member for moving said indicator.

3. In a measuring instrument adapted to cooperate with a condition responsive mechanism: a housing for said condition responsive mechanism; a cover member for said housing comprising a frame portion movable with respect to said housing, a pair of spaced transparent members immovably mounted on said frame; an indicator; a magnetic member secured to said indicator; a pair of means mounted centrally of said transparent members respectively for supporting said indicator between said transparent plates; and magnetic means external of said cover member for moving said indicator.

4. In a measuring instrument adapted to cooperate with a condition responsive mechanism: a housing for said condition responsive mechanism; a cover member for said housing comprising a frame portion movable with respect to said housing, a pair of spaced transparent members mounted on said frame; an indicator; means for supporting said indicator between said transparent plates, including a pair of telescoping members, each having a pivot point, one of said telescoping members carrying said indicator, bearing structures secured to said transparent members substantially centrally thereof respectively and adapted to cooperate with said pivot points, and resilient means urging said pivot points to cooperate with said bearing structures; and means external of said cover member for moving said indicator.

5. In a recording and indicating system adapted to cooperate with a condition responsive mechanism: an open end housing; a centrally apertured backing plate over said open end of said housing; a chart moving mechanism mounted interiorly of said backing plate, and having a shaft aligned with said aperture of said backing plate; a shaft angularly positionable by said condition responsive mechanism and substantially coaxial of said shaft of said chart moving mechanism; a U-shaped magnet fixed to said angularly positionable shaft, the bifurcations of said magnet encompassing said chart moving mechanism and having pole faces adjacent said backing plate; stylus means coupled to said angularly positionable shaft; a removably mounted cover for said housing; an indicator; magnetic means carried by said indicator; and means pivotally mounting said indicator on said cover.

6. In a recording and indicating system adapted to cooperate with a condition responsive mechanism: an open end housing; a centrally apertured backing plate over said open end of said housing; a chart moving mechanism mounted interiorly of said backing plate, and having a shaft aligned with said aperture of said backing plate; a shaft angularly positionable by said condition responsive mechanism and substantially coaxial of said shaft of said chart moving mechanism; a U-shaped magnet fixed to said angularly positionable shaft, the bifurcations of said magnet encompassing said chart moving mechanism and having pole faces adjacent said backing plate; stylus means coupled to said angularly positionable shaft; a removably mounted cover for said housing, said cover comprising a frame and a pair of spaced transparent members mounted thereon; an indicator between said transparent members; magnetic means carried by said indicator; and a pair of means respectively mounted centrally of said transparent members for pivotally mounting said indicator.

WILLIAM A. RAY.

References Cited in the file of this patent
UNITED STATES PATENTS

| Number | Name | Date |
|---|---|---|
| 1,174,787 | Wilkinson | Mar. 7, 1916 |
| 2,074,117 | Ross | Mar. 16, 1937 |
| 2,244,653 | Meer | June 3, 1941 |
| 2,417,339 | Woolley | Mar. 11, 1947 |
| 2,475,573 | Smith et al. | July 5, 1949 |